United States Patent [19]

Callahan

[11] Patent Number: 4,797,795

[45] **Date of Patent: * Jan. 10, 1989**

[54] CONTROL SYSTEM FOR VARIABLE PARAMETER LIGHTING FIXTURES

[76] Inventor: Michael Callahan, 201 W. 85th St., New York, N.Y. 10024

[*] Notice: The portion of the term of this patent subsequent to Jul. 2, 2002 has been disclaimed.

[21] Appl. No.: 66,790

[22] Filed: Jun. 25, 1987

Related U.S. Application Data

[63] Continuation of Ser. No. 750,873, Jul. 1, 1985, Pat. No. 4,697,227, which is a continuation-in-part of Ser. No. 443,127, Nov. 19, 1982, Pat. No. 4,527,198.

[51] Int. Cl.4 .............................................. G03B 15/02

[52] U.S. Cl. .................................... 362/233; 362/284; 362/272; 315/312

[58] Field of Search ................. 362/18, 233, 276, 268, 362/238, 239, 284, 293, 272, 324, 802; 315/312, 313

[56] References Cited

U.S. PATENT DOCUMENTS

| | | | |
|---|---|---|---|
| 3,448,338 | 6/1969 | Bentham et al. | 315/312 |
| 3,579,030 | 5/1971 | Bentham et al. | 315/312 |
| 3,612,855 | 10/1971 | Juhnke | 315/312 |
| 3,706,914 | 12/1972 | Van Buren | 315/312 |
| 3,845,351 | 10/1974 | Ballmoos et al. | 362/253 |
| 3,898,643 | 8/1975 | Ettlinger | 362/85 |
| 4,240,011 | 12/1980 | Dinges et al. | 315/294 |
| 4,241,295 | 12/1980 | Williams, Jr. | 315/294 |
| 4,358,715 | 11/1982 | Dinges et al. | 315/292 |
| 4,392,187 | 7/1983 | Bornhorst | 362/233 |
| 4,437,169 | 3/1984 | Bertenshaw et al. | 364/900 |
| 4,527,198 | 7/1985 | Callahan | 358/185 |
| 4,689,683 | 8/1987 | Efron | 358/185 |
| 4,697,227 | 9/1987 | Callahan | 362/233 |
| 4,716,344 | 12/1987 | Newell et al. | 315/312 |

FOREIGN PATENT DOCUMENTS

| | | |
|---|---|---|
| 1434052 | 4/1976 | United Kingdom . |
| 2077180 | 11/1981 | United Kingdom . |

OTHER PUBLICATIONS

Strand Century Light Palette Data Sheet dated 8/82.

Kliegl Performer II & III Specifications Sheet dated 3/82.

"Oh, No! It's Devo", *Lighting Dimensions* Magazine, vol. VII, No. 2, Apr./May 1983, pp. 42–49.

"The Magic of MIDI", *Lighting Dimensions* Magazine, vol. XI, No. 4, Jul./Aug. 1987, pp. 72,73.

"ESbus: A Practical Application," *Studio Sound and Broadcast Engineering* Magazine, vol. 30, No. 4, Apr. 1988, pp. 62–66.

(List continued on next page.)

*Primary Examiner*—Charles J. Myhre
*Assistant Examiner*—David A. Okonsky
*Attorney, Agent, or Firm*—Kenyon & Kenyon

[57] ABSTRACT

Improvements are disclosed to systems adapted for the control of automated or variable parameter lighting fixtures and devices capable of varying a plurality of beam parameters such as the pan, tilt, size, shape, color, and focus on the basis of desired adjustments stored by the control system for each of a plurality of desired lighting effects. Such a control system is provided with a means, such as a port, for coupling to an external device having at least one output and capable of a plurality of conditions each of which may be used to identify a different lighting effect so that the operation of the control system and the external device may be synchronized. One such external device may be a lighting memory controller adapted for the adjustment of desired intensity values and coupled to dimmers, such that the selection of a desired lighting effect by one such control system can automatically cause the other such control system to recall any stored adjustments for the same lighting effect, whereby the operation of large numbers of conventional lighting fixtures can be synchronized with that of automated fixtures while permitting the use of a separate control system for each.

20 Claims, 4 Drawing Sheets

OTHER PUBLICATIONS

"Vari*Lite Links Conventional Devices with Automated Lighting" Press Release, dated Nov. 1987.
Reprint, Vari-Lite "Black Box" ad Data Sheet, Vari--Lite VLD Dimmer Interface, copyright 1/1987.
"Entertainment Industry Standards", *Lighting Dimensions* Magazine vol. XI, No. 5, Sep./Oct. 1987, pp. 88,90.
Steve Terry Memo to CCS Committee re: Patents dated 11/13/87, Telefax Transmission from Eric Rosenthal to Michael Callahan, dated 11/18/88.
"The Television Command Center", *Lighting Dimension* Magazine 3/87.
Kliegl K-96 SCR® Dimmer Brochure, 4/1984.
Kliegl Entertainer TM Data Sheet 3/1983.
Kliegl Digital Lighting Control Systems Brochure, 2/1985.
Colormax TM Brochure, Great American Market, 1/1981.
Showchangers TM Brochure, Strand Lighting, 10/1985.
"Starlight Express", Glenn Loney, *Theater Crafts* Magazine, vol. 19, No. 2, Feb. 1985, pp. 18-62.
"Bright New World?" Tour System Design for the 1980s.
Michael Callahan, *Lighting Dimensions* Magazine, vol. VII, No. 1, Mar. 1983, pp. 62-73.
"Bright New World?", Michael Callahan, *Lighting Dimensions,* Magazine, vol. VII, No. 2, Apr./May 1983, pp. 27-39.
"Bright New World?", Michael Callahan, *Lighting Dimensions,* 6/1983.
Letter from David Bertenshaw to Michael Callahan dated 12/16/87.
"Remote-Control Systems for Television Production Equipment" Tech 3245-E, European Broadcast Union, Dec. 1984, pp. 3-13.
"Strand Lighting North America", *Lighting Dimensions* Magazine vol. XII, No. 2, Mar. 1988, pp. 82-92.

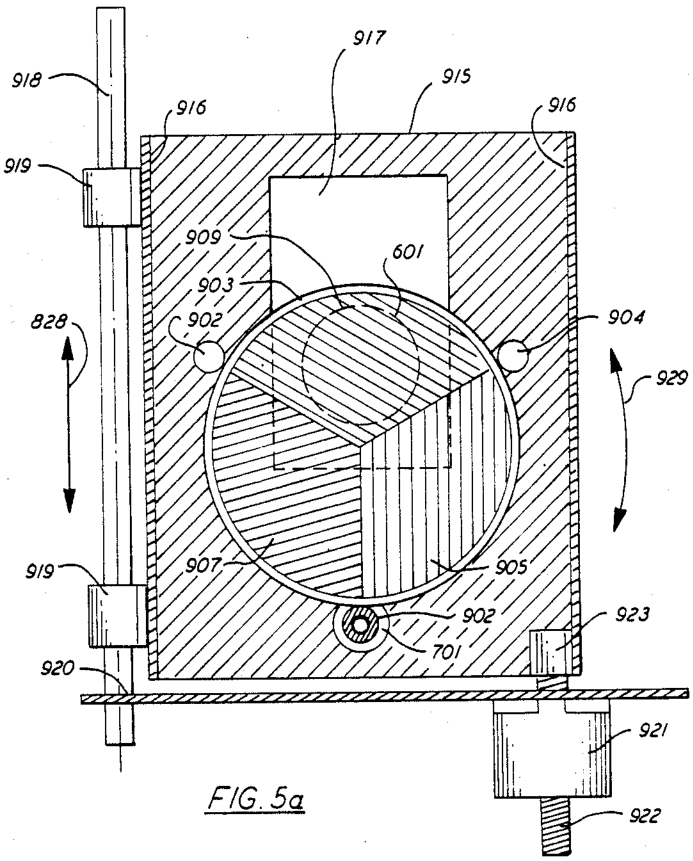
FIG. 5a
FIG. 5b
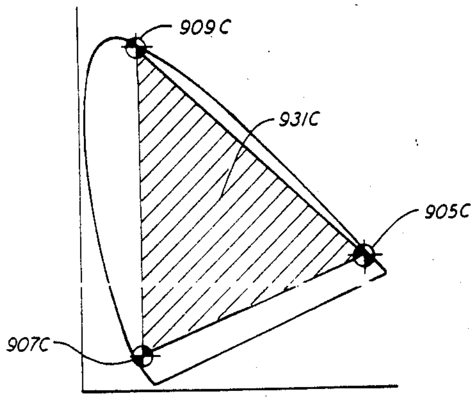

CONTROL SYSTEM FOR VARIABLE PARAMETER LIGHTING FIXTURES

This application is a continuation arising out of application Ser. No. 750,873, filed July 1, 1985, entitled "Improved Control System for Variable Parameter Fixtures", now U.S. Pat. No. 4,697,227, which, in turn, arises out of continuation-in-part application Ser. No. 443,127, filed Nov. 19, 1982, entitled "Followspot Parameter Feedback", now U.S. Pat. No. 4,527,198.

It relates to entertainment lighting and, more specifically, to an improved system for the control of lighting fixtures that are capable of remotely varying beam parameters such as color and/or azimuth and elevation during use.

BACKGROUND OF THE INVENTION

Performance lighting systems have long employed large numbers of fixtures each selected and preadjusted to produce a beam of a particular size, shape, and color aimed at a fixed location on the stage. The only beam parameter variable during the performance is intensity, and the character of the lighting effect onstage is adjusted solely by changing the relative intensities of the variety of fixtures provided.

"Memory boards" allowing a user to store and subsequently recall "presets", each of which represents a digitally-coded record of the desired intensity for each of a plurality of discretely-controllable fixtures or group of fixtures in a lighting effect have been known for decades, and the design of the modern, software-based, CRT-oriented memory board as disclosed in U.S. Pat. No. 3,898,643 has evolved to the point that such units are capable of—and lighting designers have come to demand—very complex effects. Further, lighting designers can choose from among various types and models of memory board differing in the manner in which they store cues (for example "tracking" versus "preset" boards) and in their operating protocols—and may have strong preferences for particular types and models as more familiar and/or more appropriate for a given production.

Despite the complexity of these dimming effects, lighting systems employing only fixtures controlling only intensity have the disadvantage of the need for many more fixtures than are used at any one time—or would be required were the fixtures capable of varying other beam parameters during the performance. There is the direct cost to buy or rent the large number of fixtures required plus their associated supporting structure, dimming equipment, and interconnecting cables as well as the time and labor required to install, adjust, and service this amount of equipment.

The electronic storage and recall of stored intensity values using "memory boards" has thus had no positive effect on the size of lighting systems, and indeed by removing the practical limits on the number of control channels and presets which had been imposed by manual presetting consoles, the adoption of such electronic memory boards has lead to a substantial increase in the size of the lighting systems which employ them.

It has long been apparent that were fixtures able to change beam parameters in addition to intensity (like color, beam size, or even azimuth and elevation), either as the result of integral remotely actuatable mechanisms and/or devices (like color changers) which may be retrofitted to conventional fixtures, then lighting effects could be varied by actually changing the fixtures' beams rather than dimming between otherwise identical fixtures with different fixed adjustments. Each such "multi-variable" fixture could, over the course of the performance, duplicate the results it currently requires many fixtures to achieve—as well as adding dynamic changes in the beam to the lighting effects possible—requiring fewer fixtures to produce a given lighting design with consequent savings.

The viability of employing fixtures with remotely adjustable beam size, color, shape and/or angle as a method of reducing system size depends upon a suitable control system, first disclosed in U.S. Pat. No. 3,845,351, capable of storing desired parameter values for each of the controlled parameters in each of the desired lighting effects and of automatically conforming the fixture's beam varying mechanisms to those values.

Similar systems were subsequently disclosed in U.K. Pat. No. 1,434,052 and U.S. Pat. No. 4,392,187, and today, the rental of such systems to concert, television, and theatrical productions is a multi-million dollar industry.

There have, however, been unexpected difficulties with developing a truly efficient embodiment of such a control system.

The most common approach employs completely custom hardware and software.

Any such custom control system is very expensive because the number of such systems built relative to even the limited number of conventional lighting memory boards produced is very small. No significant volume cost reductions are possible and the considerable investment in the "ground up" development of a specialized control system handling up to eight times the amount of data per fixture (relative to a conventional console) can be amortized across only a limited number of units.

Further, it is inevitable that the features and controls provided by any specialized controller will not meet the requirements of all users, and that changes will be requested by users over time. This requires a further investment by the manufacturer in hardware and software revisions, amortizable across the same relatively limited volume.

These problems have proved particularly relevant because, despite the long-held assumption that remotely adjustable devices (whether color changers, remote yokes, or multi-variable fixtures) would be used on an exclusive basis to maximize the purported gains in system efficiency, due to a variety of factors including the high cost of such equipment, it has instead been the case that the number of such devices per system may vary widely and that, contrary to expectations, devices of several different types (such as both color changers and remote fixtures) may be employed in the same system, together with conventional fixtures.

These "real world" conditions further complicate the development of an efficient control system for "multi-variable" fixtures, because previously-disclosed control systems for such fixtures had not been designed to provide for the control of large numbers of conventional fixtures in intensity only. Such prior art control systems lacked many of the features found in modern "memory boards", and failed to provide means to reconfigure their outputs, display modes, and internal operation to reallocate channel capacity allotted to multi-variable fixtures to the control of a larger number of conventional fixtures. Each conventional fixture used with a system controlling five parameters of a multi-variable fixture displaces one such multi-variable fixture, wasting the other four channels allotted to the control of the adjustable parameters other than intensity.

As a consequence of the inability of previously-disclosed custom control systems for multi-variable fixtures to address the unrecognized problem of the need to provide for the control of both large numbers of conventional fixtures as well as at least one type of multi-variable fixture in the same lighting system, entertainment lighting productions employing both have frequently found it necessary to use both a conventional memory board for the conventional fixtures and at least one specialized control system for multi-variable fixtures and devices—and two or more operators with no coordination between them save written notes and verbal cues. The process of writing and revising cues spread across two or more consoles with different operators and protocols is clearly more complex and potentially error-prone. During the performance, undesirable discrepancies and/or timing errors may arise in the execution of cues, and therefore in the responses of the fixtures controlled by the two systems to events on-stage.

Even were builders of such custom control systems to add the hardware and software required for the system to provide the additional channel capacity required for large numbers of conventional fixtures as well as the features expected of modern "memory boards", it would produce a substantial increase in both the development task and the cost of the system, for the reasons described above.

Further, without an exceptional effort, the resulting system could not duplicate the features and operating protocols of all of the types and models of memory boards in common use—and therefore would not full satisfy the preferences of all designers.

Alternatively, some recent builders of "multi-variable" fixtures, typified by the Pana-Spot TM multi-variable fixture (of Morpheus Lights, San Jose, Calif.), have not employed a custom control system, but instead have configured their fixtures to allow the use of any conventional lighting memory board, such as disclosed in U.S. Pat. No. 3,898,643.

While this approach spares the fixture manufacturer the development of a custom control system, the use of conventional memory boards to control "multi-variable" fixtures has had important disadvantages.

While such a console records and displays the variables for each fixture, all variables for all fixtures are presented uniformly as two numbers: the channel number and a percentage value. A time consuming reference to a list or table is required to determine that the beam size for fixture #8 is controlled by channel #93. Conversely, the CRT display of values is useless without conversion.

Further, such consoles generally provide input devices allowing manual or keyboard adjustment of only a single output or group of outputs at a time. Therefore, most recording operations for remote fixtures require a lengthy series of adjustments, with reference to a table of 100 or more functions between each one.

Such consoles also do not provide data manipulation features unique to multi-variable fixture use, nor can their outputs be reconfigured to provide resolutions greater than or less than 8-bits.

One might suggest modifying the standard memory controller with more appropriate input devices, display modes, outputs, and software, but that contradicts many of the advantages of using an existing controller.

Even were such modifications performed, the memory board may become more specific to the requirements of the controlled multi-variable fixture or device for which it is adapted and potentially less suitable for other types of fixture or device with different requirements. The hardware and computational workload demanded by more sophisticated features unique to the requirements of multi-variable fixtures may also exceed the capabilities of the memory board's original hardware design.

In principle, a conventional memory board used to store parameter values for multi-variable fixtures can also be used to store desited intensities for conventional fixtures.

In fact, the number of discretely-controllable channels demanded by multi-variable fixtures relative to the number of channels offered by typical memory boards used in the application has been so large, that in lighting systems employing significant numbers of multi-variable fixtures, such memory boards have insufficient channel capacity to permit discretely controlling all parameters of each fixture, much less provide the additional channels required to control large numbers of conventional fixtures. Furthermore, the user would then be unable to employ other types and models of memory boards which were unmodified, despite the fact that for the production, they might be more appropriate or desirable for the control of the conventional fixtures.

Because both the number and relative proportion of multi-variable and conventional fixtures and devices will vary widely from production to production, such a prior art memory board adapted for use with multi-variable fixtures would also have to be field-reconfigurable to compensate for the particular number and relative proportion of connected fixtures, and capable of supporting the memory and computational workload of all possible combinations.

It is the object of the present invention to provide a uniquely elegant solution to the above-described difficulties with prior art approaches to the control of systems employing both conventional fixtures and multi-variable fixtures and devices.

SUMMARY OF THE INVENTION

The system of the present invention, as first disclosed in the parent application, now U.S. Pat. No. 4,527,198 comprises a system adapted for the control of fixtures producing a beam suitable for entertainment lighting, each of a plurality of such fixtures provided with means to vary a plurality of parameters of the beam including azimuth and elevation and/or color, and with means to conform operable from a remote location and capable of cooperating with the means to vary to produce a desired adjustment of the variable beam parameter in response to the presense of a corresponding first value set at its input.

The system provides at least one memory means for storing a plurality of such first value sets, each corresponding to the desired adjustment of azimuth and elevation and/or color for one or more fixtures or devices to which it is coupled in one or more lighting effects, and for associating each of the first value sets with at least one second value identifying that lighting effect. The system further provides a means having an input for selecting, and causing the first value set stored in the memory means to be provided to the means to conform of the fixture or device coupled to the system in response to the presense of the associated second value identifying a desired lighting effect at this selection input, such that the desired adjustment to the beam parameter will be performed.

Like prior art control systems of the type, the system may provide a means for generating such second values identifying the desired lighting effect and therefore for selecting the desired lighting effect to be reproduced, this means coupled to the selection input.

The disclosed system, however, specifically provides a port for the connection of this selection input to an external device, in the preferred embodiment, an output of a conventional memory board, which is disclosed as also controlling the intensity of conventional fixtures.

The use of at least one channel output of the memory board as the selection input to the disclosed control system is illustrated, and the advantage of employing multiple channel outputs in the case that multiple control systems are employed is described.

The use of the cue number which identifies the records of fixture intensities stored in the memory board as the selection value for the control system is also described.

A control system for multi-variable fixtures or devices of the present invention therefore may be optimized to the requirements of the controlled fixture or device, with no concession to the need for conventional fixture control. When the control of such fixtures is required, the lighting designer may choose from among virtually any existing memory board based purely on his or her needs and preferences for the given production. With little or no modification, the memory board may be then coupled to the selection input of the control system of the present invention, such that the operation of the two may be precisely synchronized and coordinated as desired during both rehearsal and the performance, achieving a variety of desirable but previously contradictory objects.

The control system of the present invention, while it may provide for the control of all parameters of a multivariable fixture, may couple an input to the means for adjusting the intensity of such fixtures to the outputs of the memory board, such that the intensity of all fixtures in the system, conventional and multi-variable, may be adjusted by a single controller, again without the disadvantages which had attended previous approaches.

BRIEF DESCRIPTION OF THE DRAWINGS

FIGS. 5A and 5B are detailed views of a color changing method as may be employed with the control system of the present invention.

DETAILED DESCRIPTION OF THE INVENTION

Figure 1:
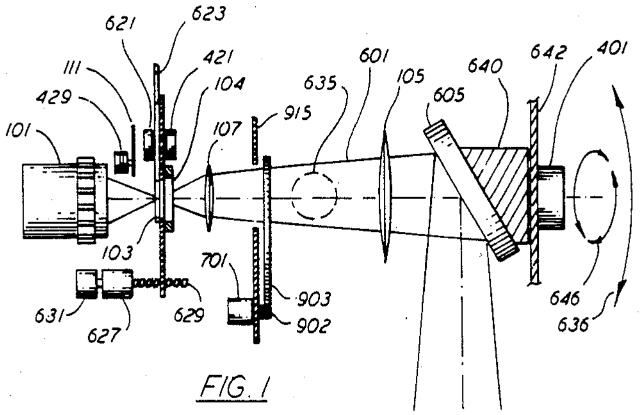
FIG. 1 is a sectional view of a multi-variable fixture as may be employed with the control system of the present invention.

Refer now to FIG. 1, a sectional view of a multi-variable fixture as may be employed with the control system of the present invention, equivalent to FIG. 1B of the parent application Ser. No. 443,127. Parts having the same function in both Figures are identified with the same reference number.

The optical system of the fixture includes light source 101 with its associated reflector and a gate or aperture 103 imaged by a pair of lenses 105 and 107.

Beam intensity may be remotely adjusted by means of dowser 111 and its associated beam intensity actuator 429, although an electronic dimmer as disclosed in U.S. Pat. No. 3,397,344 may also be employed.

Beam size may be remotely adjusted by means of iris 104 and its associated actuator 421, and/or by other means such as changes in system focal length by relative movement of lenses 105 and 107 or a variable curvature mirror 605 as disclosed in U.S. Pat. No. 4,460,943.

Beam shape may be varied by means of gobo wheel 623 and its associated actuator 621.

Beam edge sharpness may be varied by moving the aperture assembly along the optical axis with actuator 627, although more conventional movement of a lens may also be employed.

Beam azimuth and elevation may be adjusted by means of either two-axis displacement of the fixture, as disclosed in U.S. Pat. Nos. 1,680,685 and 1,747,279, or of a beam-directing mirror as disclosed in U.S. Pat. No. 2,054,224. Preferably, however, beam angle is adjusted by reflection from mirror 605 which is mounted by bracket 640 to motor 401 which, in turn, is mounted to the forward end of the fixture chassis 642. This allows the rotation 646 of the beam in a first plane perpendicular to the optical centerline. The fixture chassis 642, in turn, is supported at its center of gravity by a yoke and pivot driven by motor 635 which allows the rotation 636 of the fixture in a second plane parallel to the optical centerline yet always perpendicular to that of the first plane of rotation for the beam.

Similarly, the color of the beam 601 may be varied by any conventional means including a color wheel (as disclosed in U.S. Pat. No. 1,820,899); a semaphore changer (as disclosed in U.S. Pat. No. 2,129,641); or a roller changer (as disclosed in U.S. Pat. No. 3,099,397). Preferably, however, the color changing system illustrated in FIG. 5 would be employed. Three segments of interference-type filter material 905, 907, and 909 (such as manufactured by Optical Coating Laboratories, Inc., Santa Rosa, Calif.) of additive color primaries with CIE chromaticity coordinates 905C, 907C, and 909C form an array supported by rim 903 and rotated by motor 701 via rollers 902 and 904 mounted to support plate 915. Support plate 915, which is located in a hyperfocal region of the optical system, may be displaced along an axis in a plane perpendicular to the optical centerline of beam 601 on linear bearings 919 riding on rail 918 by motor 921 driving lead screw 922, such that the relative proportion of beam 601 passing through the filter array may be varied. Opening 917 in plate 915 allows passage of the beam. The combination of array rotation 929 and displacement 928 allows varying both the proportion of primaries and their saturation to synthesize any color sensation within area 931C.

While the fixture illustrated in FIG. 1 provides means to vary all beam parameters it will be understood that the improved control system of the present invention may be employed with fixtures designed or adapted to remotely adjust any number or combination of parameters, and with devices like color changers and remote yokes designed for use with conventional fixtures.

Similarly, a variety of actuators and actuator drives may be employed in either open or closed loop operation.

Figure 2:
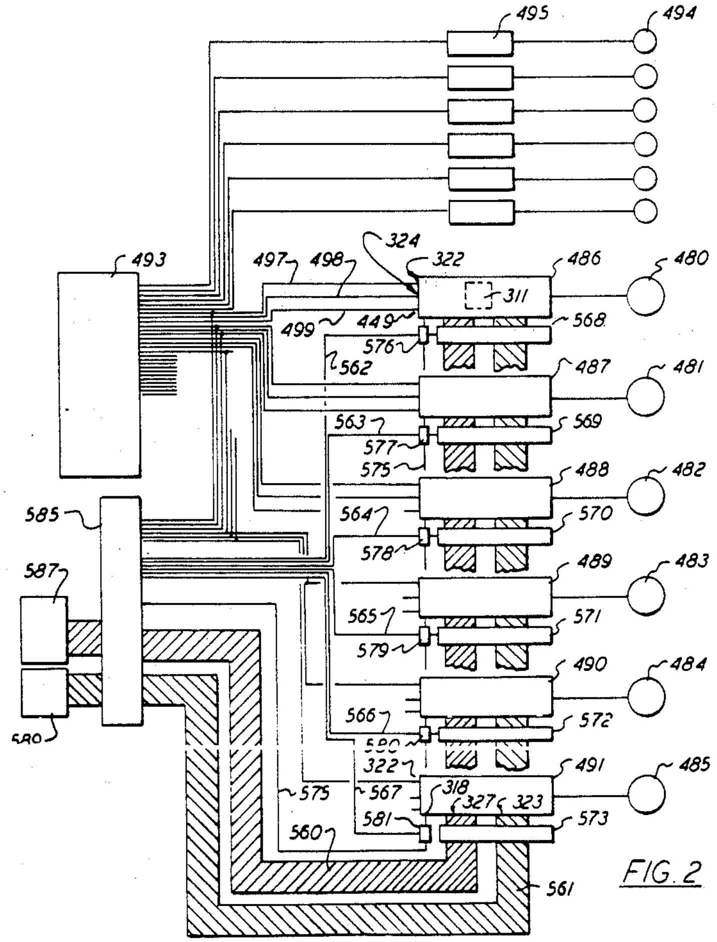
FIG. 2 is a block diagram of the control system of the present invention.

Referring now to FIG. 4B of the parent application Ser. No. 443,127, reproduced as FIG. 2, the structure of the improved control system of the present invention will be described.

A performance employs a plurality of multi-variable fixtures 480–485, together with conventional fixtures 494 whose intensity is controlled by electronic dimmers 495 responsive to conventional memory console 493.

The improved control system of the present invention employs a plurality of local control systems 486–491, which may be similar to that illustrated in FIG. 4A of the parent application Ser. No. 43,127. Each such local control system 486–491 includes a memory means 311 in which may be stored desired parameter values for the fixtures controlled by that system for each of a plurality of lighting effects. Each such local control system provides an input 322, which may be used to select the location in memory 311 at which the parameter values for a given lighting effect are stored. A means is provided, illustrated here as line 497, to couple the setting selection input 322 of the local memory means to the supervisory control unit 493. A single output of supervisory unit 493 may be employed, such that all local control systems are invariably directed to the same memory location, but preferably, the system allows different local control systems to be directed to different addresses as a method of increasing both flexibility and effective memory capacity.

The local control systems may conform their associated fixtures to the desired parameter values upon receipt of a setting selection input, but preferably, a separate output of the supervisory unit, illustrated as line 498 to input 324 of local control system 486, can be employed for a "Load" instruction.

The local control systems may record desired intensity in their memory means, but preferably, alternate and/or supervisory control of intensity may also be exercised from the supervisory unit, illustrated as line 499 to input 449 of control system 486.

As noted in the parent application Ser. No. 443,127, in the most basic embodiment, each local control system must be provided with input, display, and data carrier facilities.

Accordingly, the parent application Ser. No. 443,127 discloses means for transferring data to and from shared input, display, and data carrier facilities at the supervisory level, illustrated as data busses 560 and 561 which are common to the input ports 327 and output ports 323 of the local control systems 486–491. Means are provided, in the form of "System Select" lines 562–567, to selectively couple local control systems to the busses under the control of the supervisory data carrier 585. Similarly, means are provided in the form of line 575, for the supervisory data carrier 585 to cause selected local control systems to record data present on buss 560 in their memory means. Supervisory controls 587 and displays 589 may also be coupled to the parameter value busses between the supervisory level and the local control systems. In the manner described in the parent application Ser. No. 443,127, parameter data may be transferred between the supervisory level and the local control systems for the recording, adjustment, and display of desired parameter values, and their up-loading to and down-loading from a common data carrier. These supervisory facilities may be provided by the conventional lighting controller 493 or by custom hardware or by a combination of the two. However, unlike prior art systems, the centralized portion of the system of the present invention need contain no cue memory of its own and negligible processor power, simply serving as a terminal providing input controls and a data carrier along with the minimum of hardware required for communication with the local control systems, minimizing its cost and complexity, whether a custom controller or modification of a conventional one. In fact, the preferred embodiment employs the combination of the conventional memory controller used for the conventional fixtures and a custom controller providing input devices, displays, data carrier, and an output for the multi-variable fixtures, with an output of the conventional controller used as the setting selection input to the multi-variable fixtures as a method of synchronizing the operation of the two groups of fixtures. Synchronization of the two groups of fixtures thus requires that the conventional lighting controller produce only a cue member and "Load", a relatively modest request, involving no reduction of channel capacity or processor time.

Conversely, as many such consoles provide for an external "go" command, the supervisory control unit could maintain the cue sequence and drive the conventional controller rather than vice versa.

Figure 3:
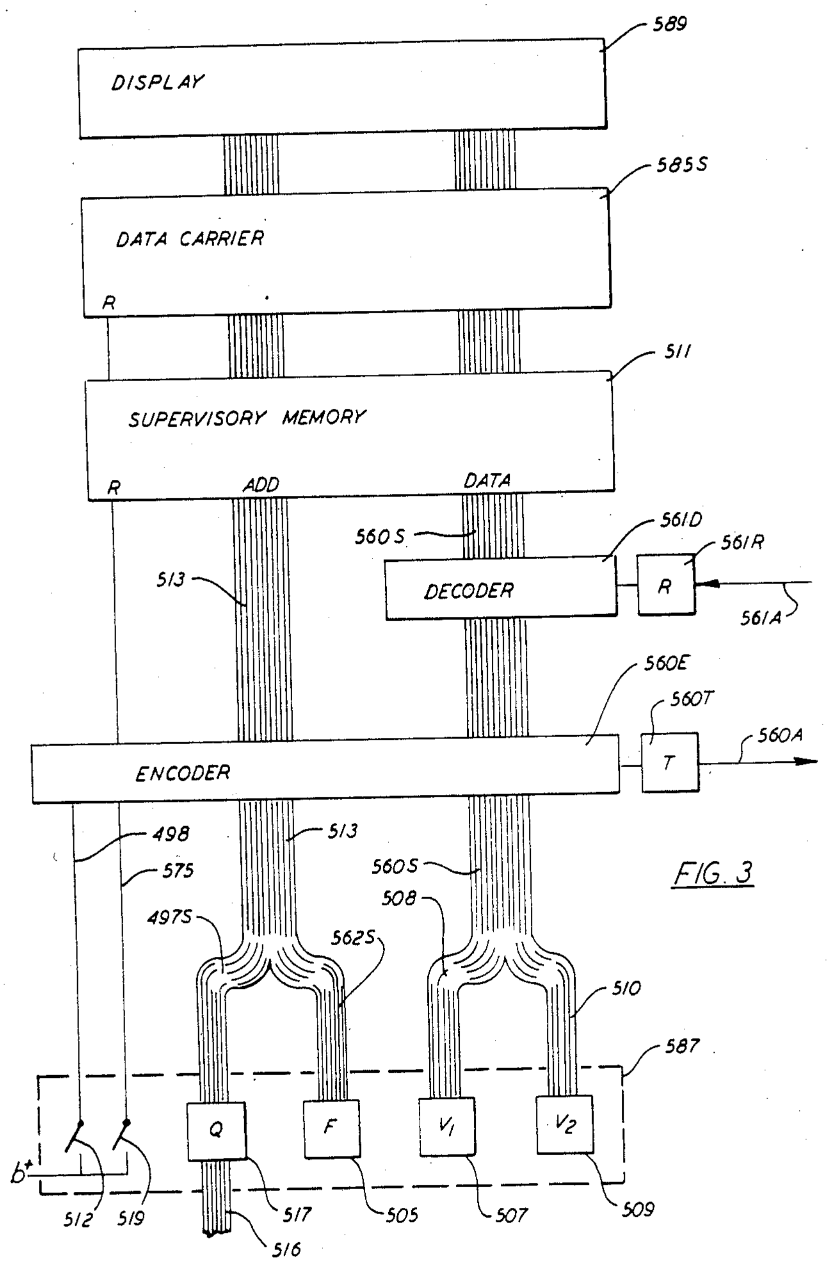
FIG. 3 is a detailed view of one embodiment of the supervisory control unit of FIG. 2.

Refer now to FIG. 3 where constructional details of a supervisory control unit are illustrated.

Supervisory controls 587 include a two master mode switches: a system Record switch 519 which causes the local control systems to store parameter values at the address specified by the Setting Select switch 517; and a System Load switch 512 which causes the local systems to conform fixture parameters to the selected values. A Fixture Select switch 505 and input controls 507 and 509 for setting the desired values of two parameters are provided. A port 516 is provided so that setting selections may be entered from an external device, such as a conventional lighting controller, in the manner previously described.

Outputs 497S and 562S of the Setting Select and Fixture Select switches form an address buss 513 which serves as an input to memory means 511, display 589, and data carrier 585S. The outputs 508 and 510 of parameter input controls 507 and 509 form a data buss 560S which serves as an input to memory means 511, display 589, and data carrier 585S. Outputs 575, 498, 497, 562, and 560S are also provided to encoder 560E for transmission via transmitter 560T to the plurality of local control systems 486–491 via data link 560A.

The use of multiplexed communications between the system controller and multi-variable fixtures is disclosed in U.S. Pat. Nos. 3,845,351 and 4,392,187, and is widely employed. Circuitry for digital asynchronous communication between a lighting controller and a plurality of receivers is described in particular detail in U.S. Pat. No. 4,095,139.

Figure 4:
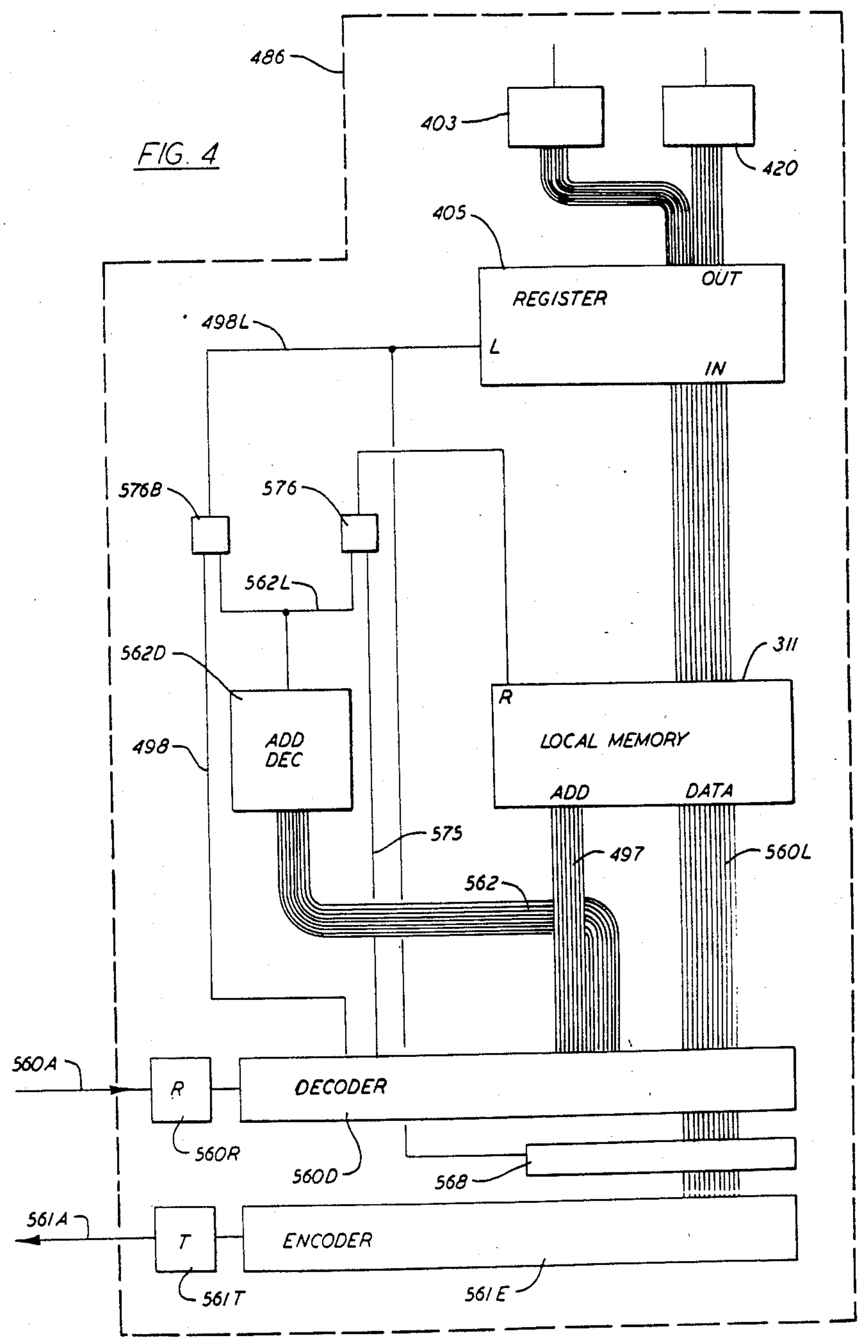
FIG. 4 is a detailed view of one embodiment of a local control system of FIG. 2.

Refer now to FIG. 4 where constructional details of a local control system are illustrated.

Local control system 486 includes local memory means 311 whose data port is connected to parameter value buss 560L which also serves as an input to register 405, whose load input is connected to System Load line 498 via AND gate 576B, whose second input is connected to output 562L of address decoder 562D. The output of register 405 serves as input to motor drives 403 and 420. The address port of memory means 311 is connected to setting select line 497. The fixture select buss 562 is connected to address decoder 562D, which is strapped to recognize the address assigned to the fixture, and which produces an output on line 562L upon doing so. This output serves as an input to AND gate 576 whose second input is the System Record line 575, and whose output is connected to the Record input of memory means 311. Inputs 497, 498, 562, 575, and 560L are connected to the output of decoder 560D which receives data from the supervisory unit over data link 560A via receiver 560R.

It will be apparent that parameter values may be entered into the register 405 of local control system 486 by closing the System Load switch 512, selecting the desired fixture with Fixture Select switch 505, and adjusting input controls 507 and 509 as required. Once the desired values have been reached, they may be entered into local memory means 311 by selecting a cue number with Setting Select switch 517 and closing System Record switch 519.

Desired values can also be "blind recorded" without display onstage by closing the System Record switch 519 with the System Load switch 512 open.

Fixture parameters can be conformed to recorded values by selecting the desired cue number with the Setting Select switch 517 and closing the System Load switch 511.

As previously described, the parameter value data stored in the memory means 311 of the local control systems can be up-loaded to a common display 589 or data carrier 585A at the supervisory level. Accordingly, FIG. 4 illustrates parameter data buss 560L as paralleled to both decoder 560D and encoder 561E via tristate driver 568. Parameter data present on buss 560L will thus be transmitted via data link 561A to the supervisory unit for display or recording, in the manner described in the parent application Ser. No. 443,127 application, when the appropriate fixture address is present on input 562. It will, however, be apparent, that either two simplex or one duplex data link are required for such communication, and that sophisticated display capabilities at the supervisory level will require significantly higher data rates on the data links as the supervisory unit querries the local control systems. It is, therefore, an object of the present invention to provide an improved control system which allows centralized display and data carrier facilities with little or no requirement for bidirectional communication.

Refer now to FIG. 3, where an additional memory means 511 is illustrated, connected in parallel to the output of the supervisory unit to the local control systems. It will be apparent that through the normal operation of the system as disclosed, each parameter value stored in a local memory means 311 of a local control system will automatically be duplicated in memory means 511 of the supervisory unit. The display of parameter values or their storage thus may employ the duplicated values stored in memory means 311, without consulting the memory means 311 of the local control systems, minimizing communications requirements on the data link 561A (and indeed permitting simpler embodiments of the system to be simplex in operation). The improved system of the present invention, however, still allows central display and data carrier features. And, while it does require a memory means 511 of sufficient capacity to store all parameter values in all cues, because for actual operation only the local memories 311 are employed, the supervisory memory 511 may comprise a comparatively economical device (in some cases, the data carrier itself).

An additional benefit of the reduction in data rates between the supervisory unit and the local systems is the ability to use data links such as infrared, ultrasonic, or power line carriers which had heretofore not been practical for such applications because of the limits on their maximum data rates.

While the operation of the system of the present invention is illustrated with hardware, microprocessors may be employed at either or both the local or the supervisory level. Indeed, it will be understood that the use of a processor at the local control system offers additional benefits.

One such benefit is increased sophistication in the transfer of data between the local system and the supervisory level—and indeed the transfer of data between local systems, such as between the system associated with a damaged fixture and that associated with a spare.

Another such benefit is the use of the local processor to perform data manipulation for its associated fixture. The employment of a microprocessor is for each local control system produces a "parallel processor" architecture in which, unlike prior art central systems, relatively sophisticated data manipulation can be performed without a substantial increase in system cost by "jobbing out" the task to the local control systems. As each increase in the number of controlled devices is accompanied by an increase in local control systems and with them, processor power, the improved control system of the present invention minimizes the cost of the shared portion (the supervisory control unit) and allows variations in system size from a few fixtures to several hundred with no modification to the supervisory unit, to the local control systems, or loss of response time, data capacity, or features.

One highly desirable data manipulation is the calculation for each fixture of the azimuth and elevation settings required for the beam to intersect an absolute location onstage from its current location over it.

By exploiting the communications capabilities of the system, the number of fixtures whose location in space must be reentered when the position of the truss or pipe supporting them changes can may be minimized. While the position of the fixture support structure relative to the stage changes, the relative positions of those fixtures on a common truss or pipe seldom does. Therefore the first and last fixture on an overhead pipe or truss might be "taught" their positions, preferably by means of an input from a position control system or sensor associated with the truss or pipe, but then communicate them to those fixtures mounted inbetween which, having previously been provided with their offsets relative to the "taught" units at the first setup, can calculate their own locations.

Further, it will be apparent that several techniques for controlling the rate at which parameters are changed will be possible. Different rates and start times are extremely complex to produce in prior art systems. It will however be apparent that a control system of the present invention whose local memories contain not only the desired condition for each cue but the desired rate of change could readily allow all units to perform in synchronization, but could equally well be used to produce individually specified rates and start times. The supervisory unit need only provide the Load instruction, and each local control system could start its transitions and vary their rates as instructed with virtually no practical limits on the complexity of the cue. Yet this capability may be provided with little or no impact on system size or cost. Similarly, each local control system can adjust its own rate of parameter change such that all parameter changes start and finish together, regardless of the variations in the amount of adjustment required.

The control system of the present invention thus not only allows any number of local control systems, and as such controlled devices, to be paralleled to the same supervisory unit and its data link, but so long as the local control systems are compatable with the data link, this approach places no limitations on the variety of control systems which can be connected with a common supervisory unit or data link; the number of variables they can maintain; and the number and type of devices they can control. There is, therefore, no reason why the same supervisory unit and buss cannot connect and coordinate color changers, remote yokes, and remote fixtures in any number and combination, each such device employing a local control system optimized for its function.

Further, as many of the same controls are required for the various types of controlled devices, the appeal of the system can be maximized, and its development cost minimized, by designing a "universal" supervisory control unit which is capable of adjusting any automated lighting product accepting the system's communication protocols.

While the simplest embodiment of the system of the present invention provides a corresponding memory location to be provided for each possible setting selection input/cue number, it will be recognized that a linked-list technique can be employed which allows the local control systems to use memory capacity only for cues in which the controlled device is active, maximizing the efficiency with which memory is employed.

It should also be noted that "transparent access" can be provided to the controlled devices for adjustment by direct command from the supervisory level with or without reference to the supervisory memory means in the prior art manner.

A hardware design for the local control unit is also possible which stores the operating program in an electrically-alterable memory accessable in certain modes from the supervisory level, such that an operator need only insert a data carrier containing the most current operating software version for the local system into the supervisory unit and download it to the local control system, such that all local systems, regardless of date of manufacture, thereafter operate on the most current software version and therefore offer the latest features and capabilities.

While the local control system would preferably be made integral with one controlled device, in some low-end applications (such as color-changers and remote yokes) it may prove more economical to locate them at an intermediate level such that one local control system drives, for example, four to eight such devices.

Ideally, the hardware design for such a local control system would allow the same printed circuit card to be applied to a number of different applications on an OEM basis with little or no modification.

What is claimed is:

1. A control system for a lighting system, said lighting system including: a plurality of light projectors, said projectors each generating a beam suitable for entertainment lighting and illuminating a common area, and each of a first plurality of said plurality of projectors provided with means to vary a plurality of parameters of said beam, such as the pan, tilt, size, shape, color and focus of said beam, and with means to conform, said means to conform operable from a remote location, having an input, having an output coupled to said means to vary, and cooperating with said means to vary to produce a desired adjustment of said parameters of said beam in response to the presense of a corresponding first value set at said input; and each of a second plurality of said plurality of projectors provided with dimming means for adjusting the intensity of said beam, said dimming means having a control input and capable of producing a desired adjustment of the intensity of said beam of at least one of said projectors in response to the presense of a corresponding third value at said control input, said control system comprising:

(a) at least one first controller, said first controller adapted to the requirements of the control of said plurality of parameters of said beam of a light projector, said first controller comprising at least:

(i) at least one short-term memory capable of storing at least five of said first value sets, each of said first value sets corresponding to the desired adjustment of said plurality of said parameters of said beam of at least one of said first plurality of projectors in at least one desired lighting effect;

(ii) at least one means adapted for entering at least one of said first value sets corresponding to a desired adjustment of said parameters for at least one of said projectors, said means adapted for entering disposed at and operable from a location remote from said projector and having at least one output;

(iii) means, coupled to said at least one output of said means adapted for entering and to said short term memory, cooperating with said means for entering to store said first value set entered by said means for entering in said short-term memory, and further for associating said first value set with at least one second value identifying a desired lighting effect;

(iv) means, having a selection input, for causing said control system to produce said first value set stored in said short-term memory at said input of said means to conform in response to the presense of an associated second value identifying a desired lighting effect at said selection input;

(b) a second controller, said controller having at least one output suitable for coupling to said control input of said dimming means, adapted for the adjustment of values corresponding to desired intensity values, said first and said second controller each capable of functioning substantially independent of the other, said second controller comprising at least:

(i) at least one short-term memory capable of storing a plurality of digitally-encoded third values corresponding to desired intensity adjustments for each of a plurality of light projectors in each of a plurality of desired lighting effects;

(ii) at least one means for entering said third values corresponding to desired intensity adjustments in at least one lighting effect for at least one of said projectors, said means for entering having at least one output;

(iii) means, coupled to said at least one output of said means for entering and to said short term memory, cooperating with said means for entering to store said third values corresponding to desired intensity values entered by said means for entering in said short-term memory, and further for associating said desired intensity values with at least one additional value identifying said lighting effect;

(iv) means, having a selection input, for causing said second controller to produce said desired intensity value stored in said short-term memory at said output suitable for coupling in response to the presense of said additional value identifying said desired lighting effect at said selection input;

(v) a first means for selecting a desired lighting effect to be reproduced, said means for selecting disposed at a location remote from said projectors, having at least a first output coupled to said selection input of said means for causing of said second controller, and capable of producing a plurality of said additional values at said first output, each of said additional values associated with a desired lighting effect;

(c) electronic means for coupling at least said first and said second controllers and for automatically producing the substantially simultaneous presense of a value associated with a given lighting effect at said selection input of said means for causing of one of said controllers and of said value associated with the same lighting effect at said selection input of said means for causing of the other of said controllers, such that the selection of a desired lighting effect may result in the presense of said corresponding first value set at said input of said means to conform and said corresponding third values at said control input of said dimming means.

2. Apparatus according to claim 1, wherein said first controller further includes a means for selecting, said means for selecting of said first controller disposed at a location remote from said projectors, having at least a first output coupled to said selection input of said means for causing, and capable of producing a plurality of second values at said first output, each of said second values identifying a desired lighting effect.

3. Apparatus according to claim 1, wherein said electronic means for coupling and for producing is responsive to the selection of a desired lighting effect by means of said means for selecting of said second controller.

4. Apparatus according to claim 2, wherein said electronic means for coupling and for producing is responsive to the selection of a desired lighting effect by means of said means for selecting of said second controller.

5. Apparatus according to claim 2, wherein said electronic means for coupling and for producing is responsive to the selection of a desired lighting effect by means of said means for selecting of said first controller.

6. Apparatus according to any one of claims 1, 2, 3, or 4, wherein said electronic means for coupling and for producing couples values to said first and said second controller identifying said desired lighting effect, such that the presense of said value associated with a given lighting effect at said selection input of one controller assures the presence of said value associated with the same lighting effect at said selection input of said other controller regardless of the sequence in which lighting effects are selected.

7. Apparatus according to claim 6, wherein said means for coupling employs a cue number.

8. Apparatus according to claim 6, wherein said means for coupling employs at least one output suitable for coupling to a dimming means of said second controller.

9. Apparatus according to claim 8, wherein a plurality of possible values at said output each corresponding to a desired lighting effect.

10. Apparatus according to any one of claims 1, 2, 3, 4, or 5, wherein a plurality of said first controllers are provided.

11. Apparatus according to claim 6, wherein a plurality of said first controllers are provided.

12. Apparatus according to any one of claims 1, 2, 3, 4, or 5, wherein a plurality of said first plurality of projectors are provided with means to vary the intensity of said beam of said projector, said means to vary the intensity of said beam having an input, and responsive to the presense of a value at said input corresponding to the desired adjustment of said intensity of said beam, wherein said input is coupled to at least one output suitable for coupling to a dimming means of said second controller such that said intensity of said beams of said plurality of said first plurality of projectors may be adjusted by means of said second controller.

13. Apparatus according to claim 6, wherein a plurality of said first plurality of projectors are provided with means to vary the intensity of said beams of said projector, said means to vary the intensity of said beam having an input, and responsive to the presense of a value at said input corresponding to the desired adjustment of said intensity of said beam, wherein said input is coupled to at least one output suitable for coupling to a dimming means of said second controller such that said intensity of said beams of said plurality of said first plurality of projectors may be adjusted by means of said second controller.

14. A control system adapted for the control of a plurality of parameters of the beam of at least one light projector, said beam suitable for entertainment lighting, said projector provided with means to vary a plurality of parameters of said beam, such as the pan, tilt, size, color, shape and focus of said beam, and provided with means to conform, said means to conform operable from a remote location, having an input, having an output coupled to said means to vary, and cooperating with said means to vary to produce a desired adjustment of said parameters of said beam in response to the presence of a corresponding first value set at said input, said improved control system comprising at least:

(a) at least one short-term memory capable of storing at least five of said first value sets, each of said first value sets corresponding to the desired adjustments of said plurality of said parameters of said beam of said projector in at least one desired lighting effect;

(b) at least one means adapted for entering at least one of said first value sets for said parameters of said projector, said means adapted for entering disposed at a location remote from said projector and having at least one output;

(c) means, coupled to said at least one output of said means adapted for entering and to said short term memory, cooperating with said means for entering to store said first value set entered by said means for entering in said short-term memory, and further for associating said first value set with at least one second value identifying a desired lighting effect;

(d) means, having a selection input, for causing said control system to produce said first value set stored in said short-term memory at said input of said means to conform in response to the presence of an associated second value identifying a desired lighting effect at said selection input;

(e) a means for selecting, said means for selecting disposed at a location remote from said projectors, having at least a first output coupled to said selection input of said means for causing, and capable of producing a plurality of second values at said selection input, each of said second values identifying a desired lighting effect;

(f) electronic means for coupling said selection input of said means for causing to an external device other than said means for selecting, said external device haviing at least one output and capable of producing a plurality of output conditions at said output each of which may be used to identify a different lighting effect;

(g) means for producing at said selection input of said means for causing, said second value identifying a desired lighting effect in response to the presense of said output condition identifying that lighting effect at said output of said external device, such that a desired lighting effect may be selected either by means of said means for selecting or by said external device.

15. A control system for a lighting system, said lighting system including: a plurality of light projectors, said projectors each generating a beam suitable for entertainment lighting and each of a plurality of said plurality of projectors provided with: means to vary a plurality of parameters of said beam, such as the pan, tilt, size, color, shape and focus of said beam; and means to conform, said means to conform operable from a remote location, having an input, having an output coupled to said means to vary, and cooperating with said means to vary to produce a desired adjustment of said plurality of parameters of said beam in response to the presence of a corresponding first value set at said input, said control system comprising:

(a) at least one means for entering at least one of said first value sets corresponding to desired adjustments of said parameters of said beam, said means for entering operable from a location remote from said projector and having at least one output;

(b) a plurality of local control systems, each of said local control systems comprising:

(i) at least one short-term memory capable of storing at least five of said first value sets, each of said first value sets corresponding to said desired adjustments of said parameters of said beam of said at least one of said projectors in at least one desired lighting effect;

(ii) means, coupled to said at least one output of said means for entering and said short term memory, cooperating with said means for entering to store said first value set entered by said means for entering in said short-term memory such that it is associated with said desired lighting effect;

(iii) means, having a selection input, for causing said control system to produce said first value set stored in said short-term memory at said input of said means to conform in response to the receipt at said selection input of a transmission identifying a desired lighting effect;

(c) manual controls for selecting a desired lighting effect to be reproduced, said manual controls disposed at a location remote from said projectors;

(d) means responsive to said manual controls and coupled to said selection inputs of said means for causing of a plurality of said local control systems for producing a transmission identifying a desired lighting effect, said transmission received at said plurality of selection inputs upon the selection of said desired lighting effect by means of said manual controls such that said means for causing of each of said plurality of local control systems will produce said first value set associated with said desired lighting effect at said input of said means to conform.

16. Apparatus according to claim 15, wherein said means for producing further provides a port for connection to an external device other than said manual controls, said external device independently controlling devices other than said projectors, having an output and capable of producing a plurality of output conditions at said output each of which may be used to identify a different lighting effect, such that the presense of one of said output conditions at said output of said external device may result in the causing of each of said plurality of local control systems to produce said first value set associated with said desired lighting effect at said input of said means to conform.

17. Apparatus according to any one of claims 15 or 16, wherein said local control systems are capable of operation at spaced apart locations.

18. Apparatus according to claim 17, wherein one of said local control systems is provided for each of said plurality of projectors.

19. Apparatus according to claim 17, wherein said means for producing includes a serial data link.

20. A method for lighting a stage performance using both lighting fixtures remotely adjustable in intensity and lighting fixtures remotely adjustable in a plurality of beam parameters such as pan, tilt, size, shape, color and focus comprising the steps of:

providing a control system adapted for the requirements of adjusting lighting fixtures in a plurality of beam parameters and capable of storing desired parameter adjustments for each of a plurality of light effects and of recalling said adjustments when the corresponding lighting effect is identified, connecting said projectors remotely adjustable in a plurality of beam parameters to said control system, providing an independent control system adapted for the adjustment of intensity and capable of storing desired intensity adjustments for each of said plurality of lighting effects and of recalling said adjustments when the corresponding lighting effect is identified, connecting at least said fixtures remotely adjustable in intensity to said independent control system adapted for the adjustment of said intensity, and, electronically coupling the two control systems such that the selection of a desired lighting effect by one such control system automatically causes the other control system to recall any stored adjustments for the same lighting effect.

* * * * *